(12) United States Patent
Hajimiri

(10) Patent No.: US 12,078,908 B2
(45) Date of Patent: Sep. 3, 2024

(54) OPTICALLY ENABLED RF PHASED-ARRAYS FOR DATA RECEPTION

(71) Applicant: California Institute of Technology, Pasadena, CA (US)

(72) Inventor: Seyed Ali Hajimiri, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 17/499,798

(22) Filed: Oct. 12, 2021

(65) Prior Publication Data

US 2022/0113607 A1    Apr. 14, 2022

Related U.S. Application Data

(60) Provisional application No. 63/104,948, filed on Oct. 23, 2020, provisional application No. 63/090,548, filed on Oct. 12, 2020.

(51) Int. Cl.
*G02F 1/21* (2006.01)
*H04B 10/2575* (2013.01)
*H04B 10/54* (2013.01)
*H04B 10/548* (2013.01)

(52) U.S. Cl.
CPC ....... *G02F 1/212* (2021.01); *H04B 10/25752* (2013.01); *H04B 10/54* (2013.01); *H04B 10/548* (2013.01)

(58) Field of Classification Search
None
See application file for complete search history.

(56) References Cited

U.S. PATENT DOCUMENTS

| | | | |
|---|---|---|---|
| 5,329,393 A | 7/1994 | Huang | |
| 6,574,021 B1 | 6/2003 | Green et al. | |
| 6,587,242 B1 | 7/2003 | Shake et al. | |
| 7,146,103 B2 | 12/2006 | Yee et al. | |
| 7,561,797 B1 * | 7/2009 | Harley | H04B 10/0793 398/159 |
| 8,526,828 B2 | 9/2013 | Nakashima et al. | |
| 10,250,330 B1 * | 4/2019 | Cabello | H04Q 11/0005 |
| 10,439,282 B2 | 10/2019 | Murakowski | |

(Continued)

FOREIGN PATENT DOCUMENTS

DE    10333127 A1    2/2005

OTHER PUBLICATIONS

International Search Report and Written Opinion dated Dec. 27, 2021, in PCT Application No. PCT/US2021/050530.

(Continued)

*Primary Examiner* — David W Lambert
(74) *Attorney, Agent, or Firm* — Weaver Austin Villeneuve & Sampson LLP

(57) ABSTRACT

A system includes, in part, a multitude of RF receivers, a first optical modulator adapted to modulate an optical signal in accordance with a first data received by a first one of RF receivers to generate a first modulated signal, a second optical modulator adapted to modulate the optical signal in accordance with a second data received by a second RF receiver to generate a second modulated signal, and a first optical fiber adapted to carry the first and second modulated signals. The optical modulator may be a photodiode or a Mach-Zehnder modulator.

16 Claims, 10 Drawing Sheets

(56) References Cited

U.S. PATENT DOCUMENTS

| | | |
|---|---|---|
| 2002/0048071 A1 | 4/2002 | Suzuki et al. |
| 2002/0154371 A1* | 10/2002 | West, Jr. .......... H04B 10/25755 398/141 |
| 2003/0059160 A1 | 3/2003 | Rikitake et al. |
| 2003/0133641 A1 | 7/2003 | Yoo |
| 2004/0062469 A1 | 4/2004 | Ionov |
| 2004/0208636 A1* | 10/2004 | Reynolds ......... H04B 10/25758 398/183 |
| 2006/0209766 A1 | 9/2006 | Britz et al. |
| 2009/0028577 A1 | 1/2009 | Oikawa |
| 2009/0232508 A1* | 9/2009 | Rumpf ............. H04B 10/25752 398/118 |
| 2010/0316391 A1 | 12/2010 | Shastri et al. |
| 2012/0082466 A1 | 4/2012 | Wu et al. |
| 2012/0092666 A1 | 4/2012 | Meijer et al. |
| 2017/0033870 A1 | 2/2017 | Dangui et al. |
| 2017/0047987 A1 | 2/2017 | Pellegrino et al. |
| 2018/0076820 A1 | 3/2018 | Abiri et al. |
| 2018/0315877 A1 | 11/2018 | Kelzenberg et al. |
| 2018/0343063 A1* | 11/2018 | Tsunoda ............... H04B 10/541 |
| 2019/0028197 A1 | 1/2019 | Turner et al. |
| 2019/0052365 A1 | 2/2019 | Joseph et al. |
| 2019/0097724 A1* | 3/2019 | Ye ....................... H04L 12/2885 |
| 2020/0145110 A1* | 5/2020 | Schuetz ................. H04B 10/64 |
| 2020/0373662 A1 | 11/2020 | Gleason et al. |
| 2022/0085886 A1 | 3/2022 | Hijimiri |
| 2022/0094459 A1 | 3/2022 | Haraguchi et al. |
| 2022/0146904 A1 | 5/2022 | Hajimiri |

OTHER PUBLICATIONS

International Search Report and Written Opinion dated Jan. 26, 2022, in PCT Application No. PCT/US2021/054638.

Prather, D.W., et al., "Optically Upconverted, Spatially Coherent Phased Array-Antenna Feed Networks for Beam-Space MIMO in 5G Cellular Communications", IEEE Transactions on Antennas and Propagation. IEEE, Aug. 3, 2017, vol. 65, No. 12, pp. 6432-6443.

U.S. Restriction Requirement dated Oct. 25, 2022 in U.S. Appl. No. 17/476,375.

International Preliminary Report on Patentability dated Apr. 27, 2023 in PCT Application No. PCT/US2021/054638.

Gal-Katziri, M., and Hajimiri, A., " A Sub-Picosecond Hybrid DLL for Large-Scale Phased Array Synchronization," IEEE Asian Conference on Solid-State Circuits, Nov. 5-7, 2018, pp. 231-234.

International Preliminary Report on Patentability dated Mar. 30, 2023, in PCT Application No. PCT/US2021/050530.

U.S. Final Office Action dated Oct. 20, 2023 in U.S. Appl. No. 17/476,375.

U.S. Non-Final Office Action dated Jun. 8, 2023 in U.S. Appl. No. 17/476,375.

U.S. Notice of Allowance dated Mar. 4, 2024 in U.S. Appl. No. 17/476,375.

* cited by examiner

OPTICALLY ENABLED RF PHASED-ARRAYS FOR DATA RECEPTION

CROSS REFERENCE TO RELATED APPLICATIONS

The present application claims benefit under 35 USC 119(e) of U.S. Application Ser. No. 63/104,948 filed Oct. 23, 2020, and U.S. Application Ser. No. 63/090,548, filed Oct. 12, 2020 the contents of both of which applications are incorporated herein by reference in their entirety.

The present application is related to and incorporates herein by reference U.S. application Ser. No. 17/476,375, filed Sep. 15, 2021 in its entirety.

FIELD OF THE INVENTION

The present invention relates to data transmission, and more particularly to such transmission using opto-electronic devices.

BACKGROUND OF THE INVENTION

RF and mm-wave phased arrays are being increasingly used in the next generation of wireless communication networks. Phased array advantages increase with increasing span (size) and the number of elements disposed in the phased array. This is, in part, due to the fact that the gain, effective isotropic radiated power (EIRP), and the electronics beamforming and beam-steering capabilities of a phased array scale favorably as the number of transmit elements of the phased array increases. Relatively large phased arrays may be used when transmission over relatively long distances, such as in space-based communication systems, are needed.

Phased arrays are gaining widespread commercial use in data communication networks, in part, due to their integration in a semiconductor substrate, such as in CMOS fabrication processes. Integrated circuits (ICs) operating at RF and millimtere wave frequencies, enable integration of a large number of components to make it possible to form cost-effective and scalable phased arrays.

In a receiver array (or a transceiver array that includes both transmitter and receiver arrays), the received signals need to receive appropriate phase shifts to form a listening beam pointed at the desired direction. However, as an array grows in size, the aggregation and coherent combining of the high-speed data across the array's multiple elements poses major challenges in complexity, cost, power consumption, size, mass, and the like. Electrical aggregation and combining of multi-giga-symbol-per-second data streams across a multitude of array elements require a complex network of adjustable delay lines, phase shifters, electrical transmission lines, splitters, matched buffers, equalizer, and the like. Such aggregation also suffers from bandwidth limitations that become difficult to mitigate as the system size becomes larger. Additionally, as the array dimensions become generally comparable to the wavelengths associated with the data bandwidth, it may be necessary to synchronize both the carrier and the data to avoid corruption and degradation of data. Large arrays are particularly important when large transmission distances are in play.

Many of today's electronic systems use one or more nodes that work collaboratively to perform complex functions, such as operating as a wireless communication phased array hub, a sensing network, internet of things (IoT), a wireless power transfer generation unit (GU), and the like.

For sparse and low-density networks of nodes (also referred to herein as arrays of elements), data communications and control is sometimes done either through wires or via a wireless link.

The power to operate the nodes is often provided locally either through a wired connection to a power source, a local power storage unit (e.g., battery), or by a local power generator (e.g., a photovoltaic power source). The required power levels for many applications, especially in denser arrays of element, often necessitate a wired connection. Additionally, such wired connectivity (for power, data, and/or control) also leads to rigid and static networks that cannot change their conformation dynamically or change their position reliably. Such flexibility and maneuverability are becoming more important as more flexible, reconfigurable, and dynamic arrays and networks are required. A need continues to exist for an improved reception, processing, aggregation of data received by and powering of a phased array.

BRIEF SUMMARY OF THE INVENTION

A system, in accordance with one embodiment of the present disclosure, includes, in part, a multitude of RF receivers, a first optical modulator adapted to modulate an optical signal in accordance with a first data received by a first one of the RF receivers to generate a first modulated signal, a second optical modulator adapted to modulate the optical signal in accordance with a second data received by a second one of the RF receivers to generate a second modulated signal, and a first optical fiber adapted to carry the first and second modulated signals.

In one embodiment, the first optical modulator is a photodiode. In one embodiment, the first optical modulator is a Mach-Zehnder modulator. In one embodiment, the system further includes, in part, a low-noise amplifier adapted to receive the first data, and a driver amplifier adapted to amplify a signal representative of an output of the low-noise amplifier to generate and apply the amplified signal to the first optical modulator.

In one embodiment, the system further includes, in part, a mixer adapted to downconvert a frequency of the output of the low-noise amplifier and deliver the frequency downconverted signal to the driver amplifier. In one embodiment, the first optical modulator is adapted to modulate an amplitude and a phase of the optical signal.

In one embodiment, the Mach-Zehnder modulator is disposed between the first optical fiber and a second optical fiber carrying the optical signal. In one embodiment, the first optical modulator is a Bragg reflector. In one embodiment, the Bragg reflector carries the optical signal and the first modulated signal.

In one embodiment, the system further includes, in part, an adjustable delay generator adapted to delay an output of the driver amplifier. In one embodiment, the adjustable delay generator includes, in part, a multitude of switched capacitors. In one embodiment, the adjustable delay generator includes, in part, a random-access memory. In one embodiment, the system further includes, in part, a second optical fiber adapted to deliver a second optical signal to the multitude of receivers to provide power to the multitude of receivers.

In one embodiment, the system further includes, in part, at least one photovoltaic power converter adapted to convert the second optical signal delivered via the second optical fiber to an electrical signal. In one embodiment, the further includes, in part, a diffuser disposed between the second optical fiber and the photovoltaic power converter to increase a distribution of an intensity of the optical signal delivered by the second optical fiber to the photovoltaic power converter.

In one embodiment, the first and second optical signal modulators are the same signal modulator. In one embodiment, the multitude of receivers are a multitude of receivers of a phased array. In one embodiment, the phased array includes, in part, a second multitude of receivers adapted to modulate the optical signal in accordance with data the second multitude of receiver receives to generate a third modulated signal and deliver the third modulated signal to another optical fiber. In one embodiment, the first and second multitude of receivers are disposed in different rows of the phased array. In one embodiment, the system further includes, in part, an optical component adapted to aggregate the modulated optical signals carried by the first and second optical fibers.

A method includes, in part, modulating an optical signal in accordance with a first data received by a first one of a multitude of RF receivers to generate a first modulated signal, modulating the optical signal in accordance with a second data received by a second one of the multitude of RF receivers to generate a second modulated signal, and delivering the first and second modulated signals to a first optical fiber.

In one embodiment, the method further includes, in part, modulating the optical signal in accordance with the first data using a photodiode. In one embodiment, the method further includes, in part, modulating the optical signal in accordance with the first data using a Mach-Zehnder modulator. In one embodiment, the method further includes, in part, receiving the first data at a low-noise amplifier, amplifying a signal representative of an output of the low-noise amplifier by a driver amplifier, and applying the amplified signal to a first optical modulator modulating the first signal.

In one embodiment, the method further includes, in part, downconverting a frequency of the output of the low-noise amplifier, and delivering the frequency downconverted signal to the driver amplifier. In one embodiment, the method further includes, in part, modulating both the amplitude and phase of the optical signal. In one embodiment, the Mach-Zehnder modulator is disposed between the first optical fiber and a second optical fiber carrying the optical signal. In one embodiment, the first optical modulator is a Bragg reflector. In one embodiment, the Bragg reflector carries the optical signal and the first modulated signal.

In one embodiment, the method further includes, in part, delaying an output of the driver amplifier by an adjustable delay generator. In one embodiment, the adjustable delay generator includes, in part, a multitude of switched capacitors. In one embodiment, the adjustable delay generator includes, in part, a random-access memory.

In one embodiment, the method further includes, in part, delivering, by a third optical fiber, a second optical signal to the multitude of receivers to provide power to the multitude of receivers. In one embodiment, the method further includes, in part, converting the second optical signal delivered via the third optical fiber to an electrical signal. In one embodiment, the method further includes, in part, increasing the distribution of the intensity of the second optical signal delivered by the second optical fiber.

In one embodiment, the modulation of the optical signal by the first and second data is performed by the same modulator. In one embodiment, the multitude of receivers are a multitude of receivers of a phased array. In one embodiment, the phased array includes, in part, a second multitude of receivers adapted to modulate the optical signal in accordance with data the second multitude of receiver receives to generate a third modulated signal and deliver the third modulated signal to a second optical fiber. In one embodiment, the first and second multitude of receivers are disposed in different rows of the phased array. In one embodiment, the method further includes, in part, aggregating the modulated optical signals carried by the first and second optical fibers.

DETAILED DESCRIPTION OF THE INVENTION

In accordance with one embodiment of the present disclosure, data received from an array of receive antennas are processed optically. The array of antennas may form a phased array receiver or transceiver. The received data may have carrier a frequency range defined by radio frequency (RF), mm-wave, microwave, and THz frequencies. Accordingly, herein RF is understood to refer to radio frequency (RF), mm-wave, microwave and THz frequencies, and excludes optical, IR and visible light spectrum Embodiments of the present disclosure, therefore, reduce mass, while enhancing flexibility and bandwidth of the system.

An optically enabled receiver, in accordance with embodiments of the present disclosure, processes the received data in the optical domain using an optical network that may be physically connected (e.g., via optical fiber) or in free space. Such processing and conditioning of the received data may include retiming, phase alignment, summation, and the like. The optically enabled receiver may operate in concert with an optically enabled transmitter, as described in U.S. application Ser. No. 17/476,375, the content of which is incorporated herein by reference herein in its entirety, and utilize the same optical distribution and aggregation network (such as the optical fiber network) used by the optically enabled transmitter. Alternatively, an optically enabled receiver may use one or multiple separate/parallel optical distribution and aggregation network, as described further below.

Figure 1A:
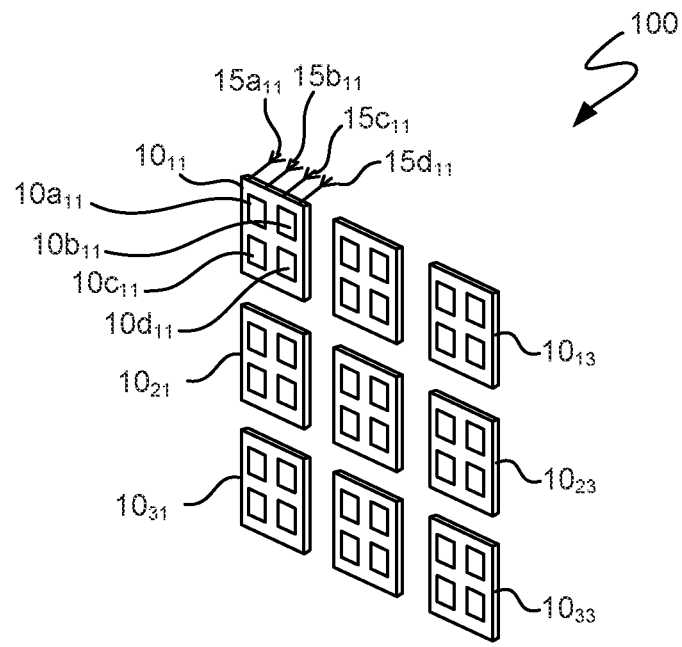
FIG. 1A is a simplified high-level schematic diagram of a phased array.

FIG. 1A shows an exemplary 3×3 array 100 of a receiver array. Receivers $10_{11}$, $10_{12}$, $10_{13}$ are shown as forming the first row of the array; receivers $10_{21}$, $10_{22}$, $10_{23}$ are shown as forming the second row of the array; and receivers $10_{31}$, $10_{32}$, $10_{33}$ are shown as forming the third row of the array. Each receiver is shown as having four receive elements and four associated antennas. For example, receiver $10_{11}$ is shown as having four receive elements $10a_{11}$, $10b_{11}$, $10c_{11}$, and $10d_{11}$, and four antennas $15a_{11}$, $15b_{11}$, $15c_{11}$, and $15d_{11}$.

Figure 1B:
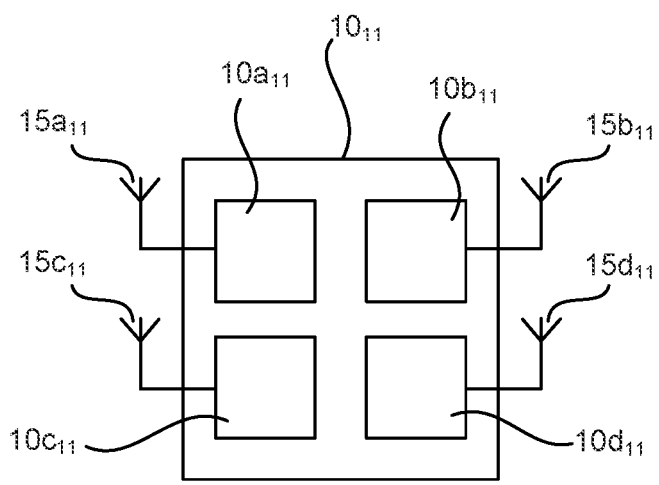
FIG. 1B is a more detailed view of a receiver of the phased array shown in FIG. 1A.

FIG. 1B is a more detailed view of receiver $10_{11}$ showing that antenna $15a_{11}$ supplies the data it receives to receive element $10a_{11}$, antenna $15b_{11}$ supplies the data it receives to receive element $10b_{11}$, antenna $15c_{11}$ supplies the data it receives to receive element $15c_{11}$, and antenna $15d_{11}$ supplies the data it receives to receive element $10d_{11}$. Although not shown in detail in FIGS. 1A and 1B, each of the other receivers $10_{ij}$ (i and j are indices defining the row and column number of the receiver) includes 4 receive elements and 4 antennas that are similarly arranged as shown with respect to receiver $10_{11}$. It is understood that a phased array, in accordance with embodiments of the present disclosure, may have any number of row and columns. In other words, i and j may be any integer numbers greater than or equal to 2. It is also understood that each receiver may include any number of receive elements and antennas. The following description of the embodiments of the present disclosure are provided with reference to an array of receivers of a phased array. While it may not be stated explicitly, it is understood that each receiver may include a number of receive elements, as described above.

In accordance with embodiments of the present disclosure, the signal received by each receiver (or receiver element) is used to modulate the amplitude and/or phase (or a combination of both) of an optical signal. The optical signal may be generated on a photonics integrated circuit disposed on the receiver or delivered to the receiver via an optical medium, such as an optical fiber. The optical signals so modulated are then aggregated and delivered to an optical control unit for further processing.

Figure 2:
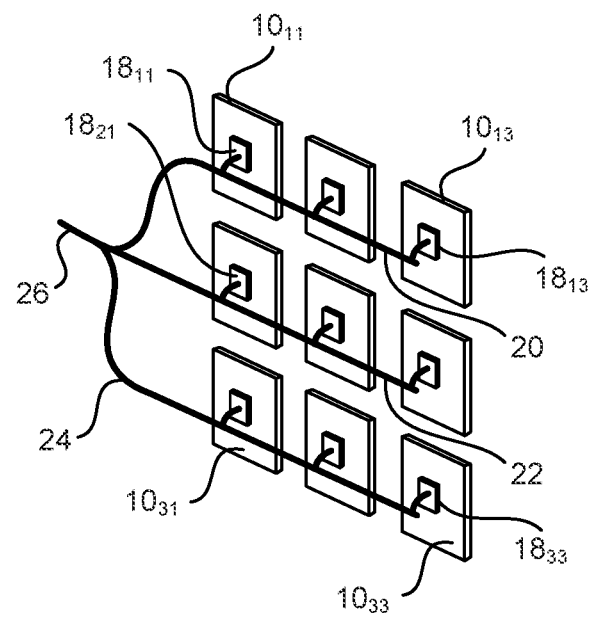
FIG. 2 shows the phased array of FIG. 1A in which the RF signals received by receivers are used to modulate an optical signal, in accordance with one embodiment of the present disclosure.

FIG. 2 shows the 3×3 array 100 of FIG. 1 in which the RF signal received by each receiver is used to modulate an optical signal and deliver the modulated optical signal to one or more optical fibers. For example, circuit $18_{11}$, disposed in receive $10_{11}$ is adapted to modulate an optical signal (not shown in FIG. 2) using the RF signal that receiver $10_{11}$ receives from its associated antenna, as shown in FIGS. 1A and 1B, and deliver the modulated optical signal to optical fiber 20. In a similar manner, circuit $18_{21}$ is adapted to modulate the RF signal that receiver $10_{21}$ receives from its associated antenna and deliver the modulated optical signal to optical fiber 22; and circuit $18_{33}$ is adapted to modulate the RF signal that receiver $10_{33}$ receives from its associated antenna and deliver the modulated optical signal to optical fiber 24. In the exemplary embodiment shown in FIG. 2, the receivers disposed in the same array are shown as delivering their modulated signals to the same optical fiber. For example, receivers $10_{11}$, $10_{12}$ and $10_{13}$ are shown as delivering their optically modulated signals to optical fiber 20; receivers $10_{21}$, $10_{22}$ and $10_{23}$ are shown as delivering their optically modulated signals to optical fiber 22, and receivers $10_{31}$, $10_{32}$ and $10_{33}$ are shown as delivering their optically modulated signals to optical fiber 2y. It is understood, however, that embodiments of the present disclosure are not so limited, and that any number of optical fibers may be used to deliver the optically modulated signals from the receiver array for aggregation and further processing.

Figure 3:
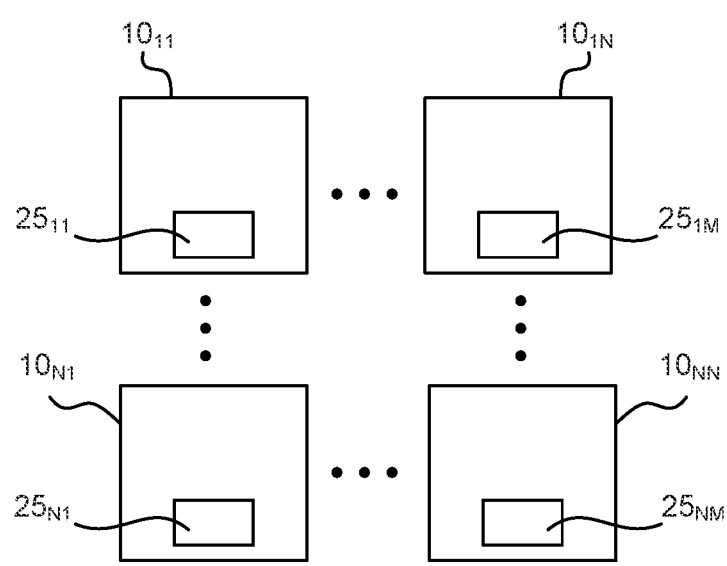
FIG. 3 is a simplified high-level schematic diagram of a multitude of receives of a phased array, in accordance with one embodiment of the present disclosure.

In some embodiments, the optical signal (i.e., the laser) that is modulated by the RF signal associated with each receiver is generated locally on one or more photonics integrated circuits disposed on the receiver. For example, in one embodiment, each receiver may include a Vertical Cavity Surface Emitting Laser (VCSEL) that generates the laser modulated by the receiver. In other embodiments, the laser generated by a VCSEL may be shared by a multitude of receivers. FIG. 3 shows an array of N×M receivers $10_{ij}$, where i is an index ranging from 1 to N, and M is an index ranging from 1 to M and where N and M are integers greater than 1. Each receiver $10_{ij}$ is shown as having disposed therein a source of laser $25_{ij}$. In other embodiments (not shown), the laser is generated in each of a subset of the receivers and then shared by the subset of the receivers. For example, the laser generated in receiver $10_{11}$ may be shared between receivers $10_{11}$, $10_{12}$, $10_{21}$ and $10_{22}$; the laser generated in receiver $10_{13}$ may be shared between receivers $10_{13}$, $10_{14}$, $10_{23}$ and $10_{24}$, and the like.

Figure 4A:
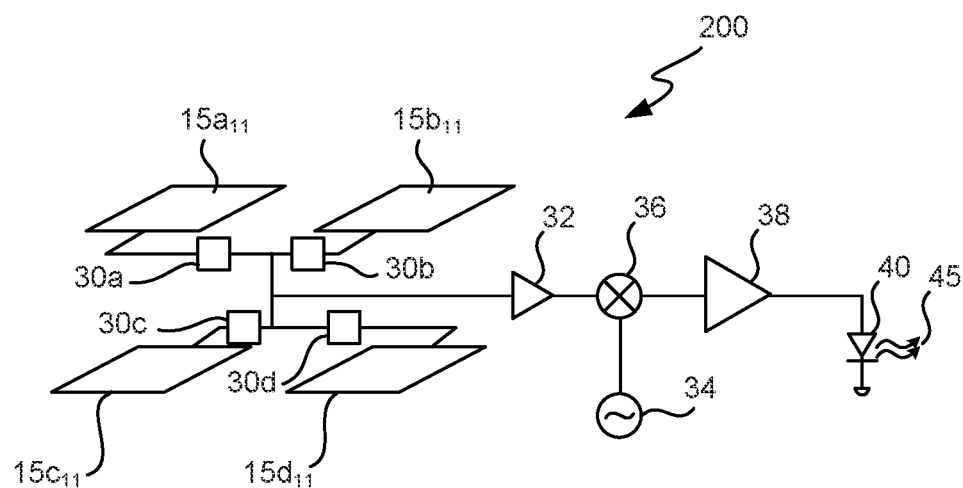
FIG. 4A is a simplified high-level schematic diagram of an exemplary circuit adapted to modulate an optical signal using signals received from a multitude of receive antennas of a phased array, in accordance with one embodiment of the present disclosure.

FIG. 4A is a simplified schematic diagram of an exemplary circuit adapted to modulate an optical signal using a signal received from a multitude of receive antennas, in accordance with one embodiment of the present disclosure.

For clarity, the circuitry associated with one of the receivers of a receive array is shown in FIG. 4A. Each of the signals received by antennas $15a_{11}$, $15b_{11}$, $15c_{11}$, $15d_{11}$ of a receiver, as is also shown in FIGS. 1A and 1B, is optionally delayed by an associated adjustable delay element. For example, the signal received by antenna $15a_{11}$ is shown as being delayed by adjustable delay element 30a; the signal received by antenna $15b_{11}$ is shown as being delayed by adjustable delay element 30b, the signal received by antenna $15c_{11}$ is shown as being delayed by adjustable delay element 30c; and the signal received by antenna $15d_{11}$ is shown as being delayed by adjustable delay element 30d. The signals delayed by the adjustable delay elements are subsequently combined and amplified by low-noise amplifier 32. The frequency of the output signal of amplifier 32 is downconverted by frequency downconverter (mixer) 36 from, for example, 28 GHz to 5 GHZ, using the oscillating signal supplied by local oscillator (LO) 34. The output signal of mixer 36 is then amplified by driver amplifier 38 and applied to laser photo-diode 40. The amplitude of the optical signal 45 generated by laser diode 40 is therefore modulate by the RF signals received by antennas $15a_{11}$, $15b_{11}$, $15c_{11}$, $15d_{11}$.

Figure 4B:
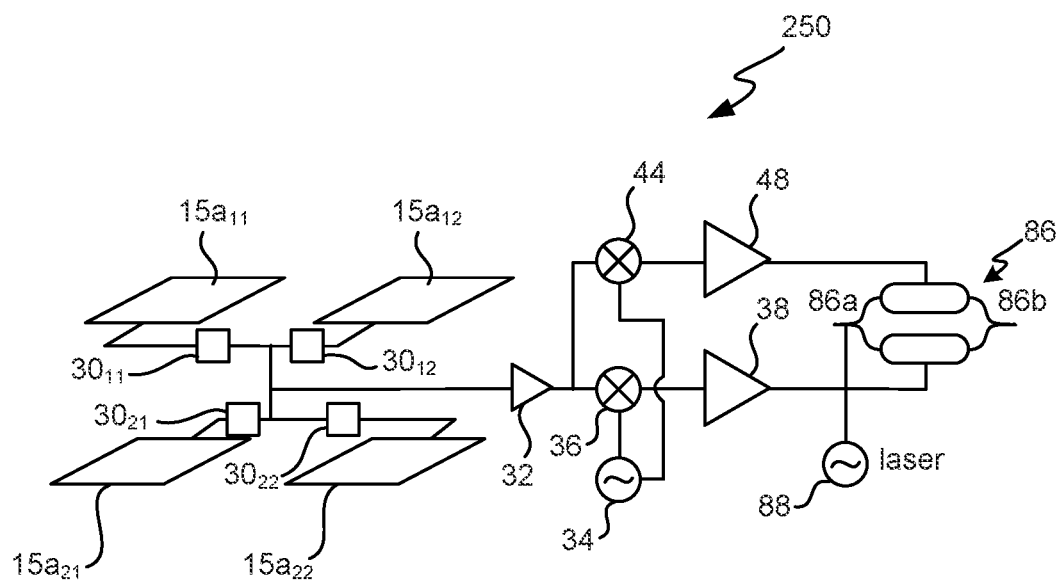
FIG. 4B is a simplified high-level schematic diagram of an exemplary circuit adapted to modulate an optical signal using signals received from a multitude of receive antennas of a phased array, in accordance with one embodiment of the present disclosure.

FIG. 4B is a simplified schematic diagram of a modulation circuit 250, in accordance with another exemplary embodiment of the present invention. Modulation circuit 250 is similar to modulation circuit 200 except that modulation circuit 250 is adapted to modulate both the phase and amplitude of the optical signal. To achieve this, modulation circuit 250 includes a second mixer 44 and a second driver amplifier 48. Mixer 36 generates an in-phase (I) signal, and mixer 44 generates a quadrature-phase (Q) from the signal supplied by amplifier 32. The output signals of driver amplifiers 38 and 48, which are respectively coupled to mixers 36, 44, are applied to Mach-Zehnder modulator 86 that receives a laser signal at its input port 86a. The output port 86b of Mach-Zehnder modulator 86 supplies a phase and amplitude modulated optical signal. In some embodiments, the modulation of the optical signal is carried out using, for example, an electro-absorption modulator.

The modulated optical signals, as described above and shown for example in FIG. 2, are subsequently coupled to one or more optical fibers where the optical signal powers are combined (i.e. aggregated) with one another to generate a combined optical signal. The coupling of the optical signals may be carried out in multiple stages, hierarchically, or all at once in one location. In some embodiments, the aggregation of the modulated optical may be performed optically by delivering the modulated optical signals to one or more optical fibers. In yet other embodiments, the modulated optical signals may be converted to corresponding electrical signals and combined using electrical circuits.

Although in FIGS. 4A and 4B, the RF signals from four different antennas are shown as being combined at the outputs of the adjustable delay elements, it is understood that in other embodiments, the RF signals received by the antennas associated with any number of receivers may be used to modulate an optical signal. In yet other embodiments, the signal received by each antenna may be used to individually to modulate an optical signal.

Figure 5A:
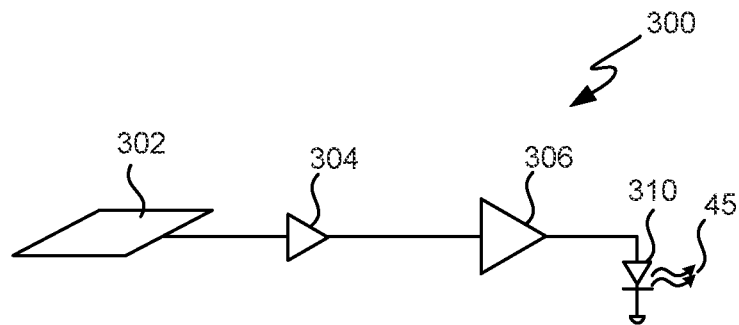
FIG. 5A is a simplified high-level schematic diagram of an exemplary circuit adapted to modulate an optical signal using a signal received from a receive antenna, in accordance with one embodiment of the present disclosure.

FIG. 5A is a simplified schematic diagram of an optical modulation circuit 300, in accordance with one embodiment of the present disclosure, that modulates an optical signal at elemental antenna level. In other words, modulation circuit 300 is adapted to use the signal received by an antenna to modulate an optical signal. As shown, the signal received by antenna 302 is amplified by low-noise amplifier 304. The output signal of low-noise amplifier 302 is further amplified by driver amplifier 306 and applied to laser diode 310 to generate a modulated optical signal 45.

Figure 5B:
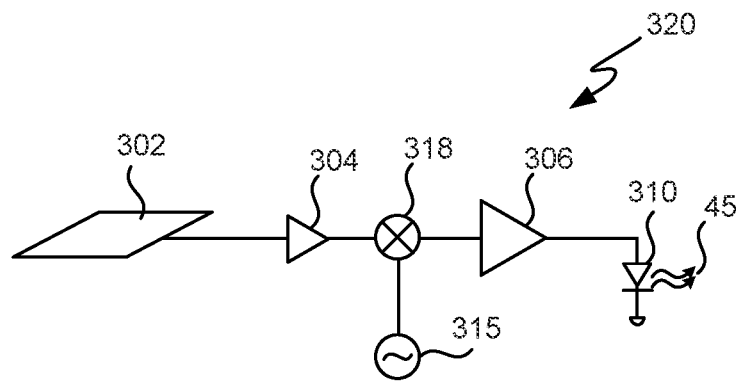
FIG. 5B is a simplified high-level schematic diagram of an exemplary circuit adapted to modulate an optical signal using a signal received from a receive antenna, in accordance with one embodiment of the present disclosure.

FIG. 5B is a simplified schematic diagram of an optical modulation circuit 320, in accordance with another embodiment of the present disclosure. Modulation circuit 320 is similar to modulation circuit 300 except that modulation circuit 320 includes a mixer 318 that downconverts the frequency of the signal generated by low-noise amplifier 304 using the LO signal supplied by oscillator 315. The output of mixer 318 is amplified by driver amplifier 306 and applied to laser diode 310 to generate a modulated output signal 45.

Figure 5C:
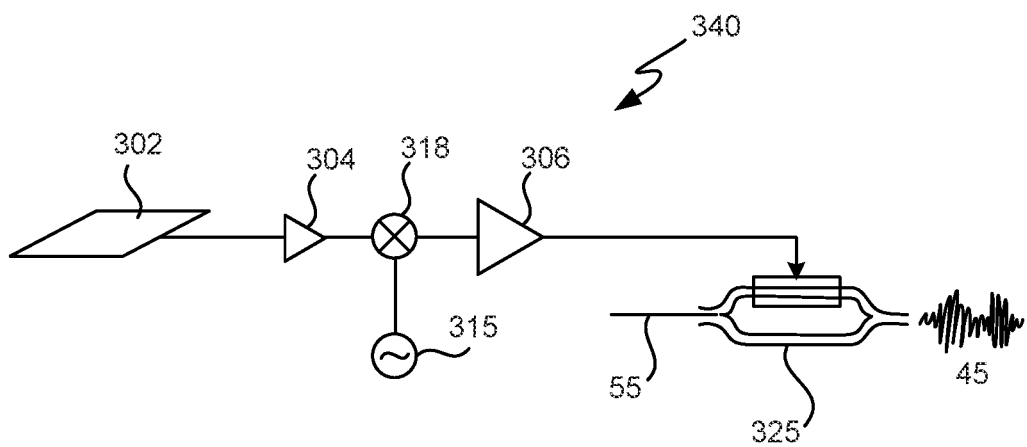
FIG. 5C is a simplified high-level schematic diagram of an exemplary circuit adapted to modulate an optical signal using a signal received from a receive antenna, in accordance with one embodiment of the present disclosure.

FIG. 5C is a simplified schematic diagram of an optical modulation circuit 340, in accordance with yet another embodiment of the present disclosure. Modulation circuit 340 is similar to modulation circuit 300 except that in modulation circuit 340, the output of driver amplifier 306 is applied to a Mach-Zehnder modulator 325. Optical signal 55 delivered to Mach-Zehnder modulator 325 is modulated using the output signal of driver amplifier 306. The modulated optical signal 45 is received from the other port of the Mach-Zehnder modulator.

In some embodiments, the RF signals received by antennas from multiple receivers may be used to modulate an optical signal. For example, referring to FIG. 1A, the signal received by antennas disposed in receivers $10_{11}$ and $10_{12}$ may be used to modulate an optical signal. In another example, the signals received by all the antennas disposed in receiver 100 may be used to modulate an optical signal. It is understood that, in accordance with embodiments of the present disclosure, the RF signals received by any number of receiving elements or receivers can be combined and conditioned (e.g., amplifier, delayed, phase shifted, and/or digitized) in the electrical domain to form a combined (aggregated) electrical signal used to modulate the optical signal. It is also understood that the optical signals so modulated may be aggregated either hierarchically, or in multiple stages, or at a single location to form a combined optical signal. Embodiments of the present disclosure are not limited by the number of the receiving elements or receivers whose output signals are aggregated (as shown for example in FIG. 4A) to modulate an optical signal.

Embodiments of the present disclosure are also not limited by the number of the stages or locations used to combine the modulated output signals. Therefore, in accordance with embodiments of the present disclosure, electrical and optical aggregations of the signals may occur in any manner and along any number of points.

As described above, in some embodiments, an optical signal from either a single source or multiple optically locked (e.g., through phase or injection locking) sources may be transmitted from one (or multiple) locations to operate as the optical signal source that is subsequently modulated at the receiving element, or at a cluster of receiving elements or at a receiver, by the received RF signal. The optically modulated signal(s) are then delivered to one or more aggregation point to form an aggregated signal. Such modulation may be performed in a number of different ways, including but not limited to, using an inline modulator, a directional coupler, a circulator that modulates the incoming optical signal and transmits it through one or more optical mediums such as optical fiber(s).

Figure 6A:
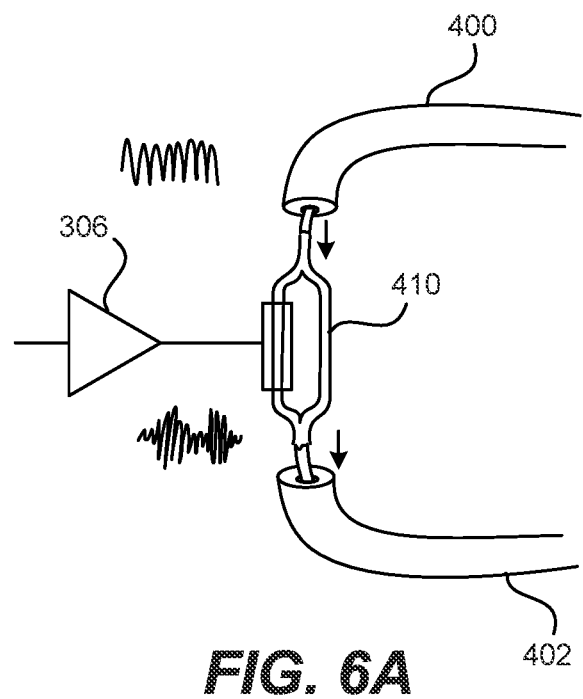
FIG. 6A is a simplified high-level schematic diagram of an exemplary circuit adapted to modulate an optical signal, in accordance with one embodiment of the present disclosure.

As described above, in some embodiments, one or more optical fibers forming a first set of optical fibers may be used to carry an unmodulated optical signal from a laser to the receivers of the phased array. The modulated optical signal(s) are then carried in one or more optical fibers forming a second set of optical fibers. FIG. 6A shows an exemplary embodiment in which an unmodulated optical signal from a source and carried in optical fiber 400 is delivered to Mach-Zehnder modulator 410. The optical signal is then modulated using the electrical signal applied to Mach-Zehnder modulator 410 by a driver amplifier 306, as described above with reference to FIG. 5A. The modulated optical signal is then delivered to optical fiber 402 for aggregation and further processing.

Figure 6B:
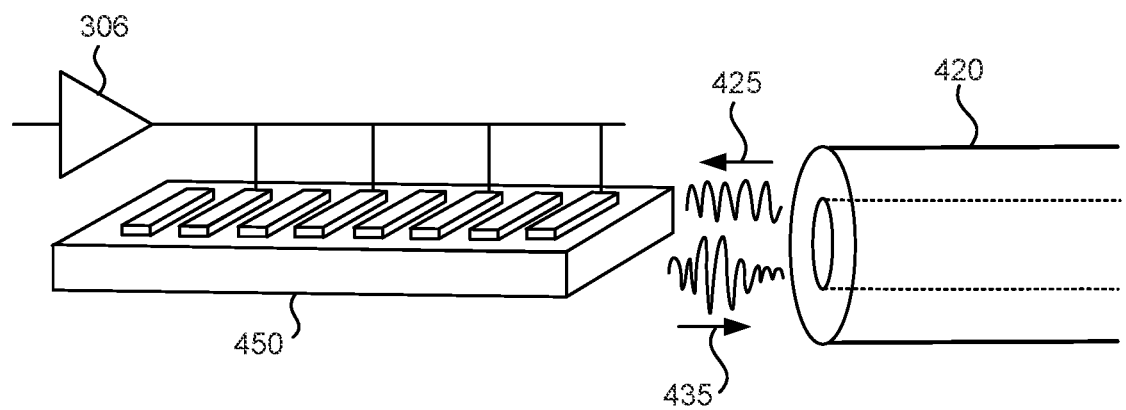
FIG. 6B is a simplified high-level schematic diagram of an exemplary circuit adapted to modulate an optical signal, in accordance with one embodiment of the present disclosure.

In some embodiments, the same optical medium is used to carry both the unmodulated optical signal and the modulated optical signal. FIG. 6B shows an optical fiber 420 which carries both the unmodulated and the modulated optical signal, in accordance with another embodiment of the present disclosure. The incoming unmodulated optical signal 425 is enabled to reflect off modulated distributed Bragg reflectors (MDBR) 450 whose reflectivity varies in response to the signal MBDR 450 receives from driver amplifier 306, described further above with reference to FIG. 5A. The reflected signal 455 is then received by optical fiber 420 and delivered for aggregation and further processing. By dynamically controlling, via the signal applied by driver amplifier 306, the fraction of the power of incident optical signal 425 that is reflected off MDBR 450, modulation of signal 425, as represented by reflected signal 435 is achieved. It is understood that the signal applied by driver amplifier 306 may represent a signal received from a single antenna, or multiple antennas of the same receiver or a multitude (cluster) of antennas of different receivers.

In order to accommodate high symbol-rate (high data-rate) of the received data, in accordance with some embodiments, time-delay adjustment may be performed within the receive elements or a cluster of received elements of an array. The time-delay adjustments may be performed in the electrical domain by electronic circuitry and/or in optical domain by optical components.

Figure 7:
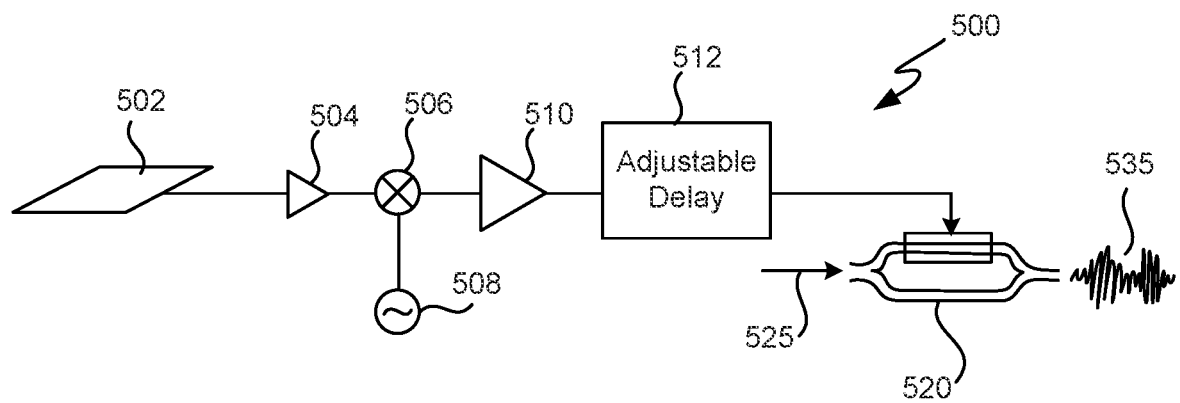
FIG. 7 is a simplified high-level schematic diagram of an exemplary circuit adapted to modulate an optical signal, in accordance with one embodiment of the present disclosure.

FIG. 7 is a simplified schematic diagram of an exemplary circuit adapted to generate a delay so as to modulate an optical signal, in accordance with one embodiment of the present disclosure. The signal received by antenna element 502 is shown as being amplified by low-noise amplifier 502. The frequency of the output signal of amplifier 502 is downconverted by mixer 506 using the signal supplied by local oscillator 508. The output signal of mixer 506 is then amplified by driver amplifier 510, delayed by adjustable delay element 512, and then applied to Mach-Zehnder modulator 520. The optical signal 525 arriving at the input port of Mach-Zehnder modulator 520 is modulated in accordance with the signal supplied by adjustable delay element 512 to generate the modulated optical signal 535.

Figure 8:
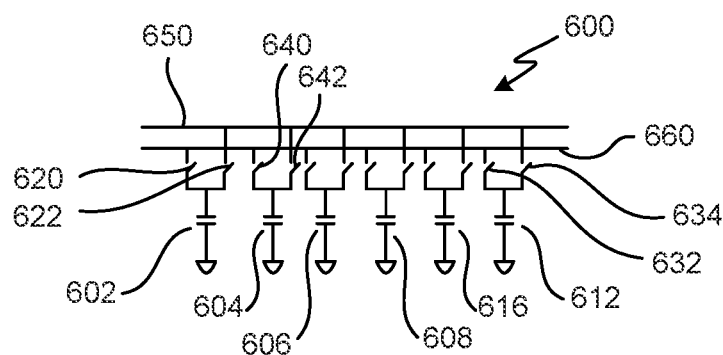
FIG. 8 is a simplified high-level schematic diagram of a delay generation circuit, in accordance with one embodiment of the present disclosure.

FIG. 8 is a simplified schematic diagram of an exemplary circuit 600 adapted to generate a delay so as to modulate an optical signal as described above, in accordance with another embodiment of the present disclosure. Circuit 600 includes a multitude of storage capacitors that are used to sequentially store the stored the data and read back the stored data at a later time, thereby to generate a timing delay between the storage and read-back. Circuit 600, which includes a multitude of switched capacitors, is shown as including capacitors 602, 604, 606, 608, 610, 612. One terminal of each capacitor is connected to the ground terminal. The other terminal of each capacitor is coupled to a readline 650 via a first switch, and to a writeline 660 via a second switch. For example, capacitor 602 is shown as being coupled to readline 650 via switch 620 and to wordline 660 via switch 622. In a similar manner, capacitor 604 is coupled to readline 650 via switch 640, and to wordline 660 via switch 642, and capacitor 612 is coupled to readline 650 via switch 632, and to wordline 660 via switch 632. By controlling the timing of the signals applied to the switches to store the data present on wordline 660 in a capacitor, and the timing of the signals applied to the switches to read back the data stored in a capacitor using readline 650, the desired delay is generated.

Figure 9:
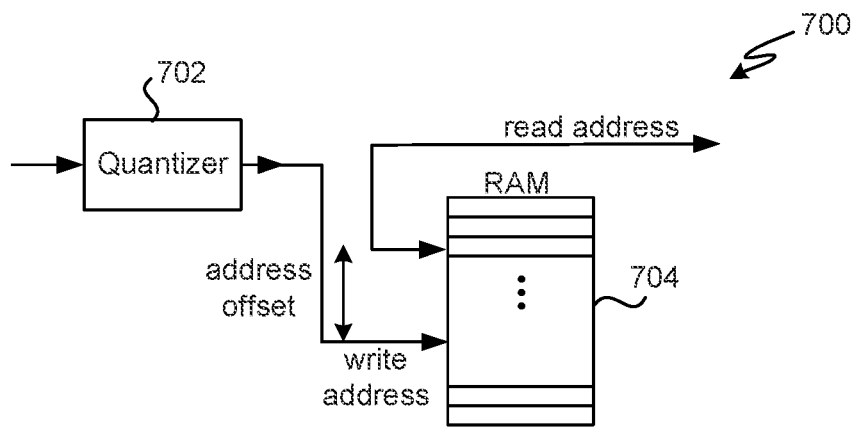
FIG. 9 is a simplified high-level schematic diagram of a delay generation circuit, in accordance with one embodiment of the present disclosure.

In other embodiments, the received RF data are quantized and stored in a random-access memory (RAM) that is read with an adjustable offset subsequent to a write operation to generate the required delay. FIG. 9 is a simplified schematic diagram of a circuit 700 adapted to generate a delay, in accordance with another embodiment of the present disclosure. Circuit 700 is shown as including, in part, a quantizer 702 and a random access memory (RAM) 704. Quantizer 702 is adapted to quantize the received RF signal. The quantized signal is then stored (written) in a RAM 704 address and read-back. The offset between the write and read address together with the clock rate of RAM 904 defines the adjustable delay. Therefore, by changing the difference (offset) between the write and read addresses in which the data is stored, the desired delay is generated.

The quantization performed by quantizer 702 may have any number of levels, including a 1-bit quantization that in some embodiments may be achieved using a comparator. The optical signal can be modulated directly by the analog signal or with the digitized data as single or multi-level data.

In accordance with another embodiment of the present disclosure, power distribution to various nodes of an electronic/optical system is performed using one or more optical fibers. The optical fiber(s) carries an optical signal from an optical power source, such as a laser or a high efficiency LED, to various nodes/locations of an electrical, optical or opto-electronic system where the optical signal is converted to electrical power using photovoltaics cells. The photovoltaic cells, in turn, generate the power required to turn on and/or operate electrical, optical or opto-electronic disposed in the nodes.

When used in a phased array, embodiments of the present disclosure substantially simplify the construction and/or scaling of the array to larger dimensions, while concurrently lowering the cost and the power consumption of the system. Embodiments of the present disclosure also lower the mass, size, and complexity of the system, as light-weight optical fibers eliminate electrical power lines. The following embodiments of the present disclosure are described with reference to a phased array. It is understood, however, that the embodiments of the present disclosure are not so limited and equally apply to any electronic or optical system.

Figure 10:
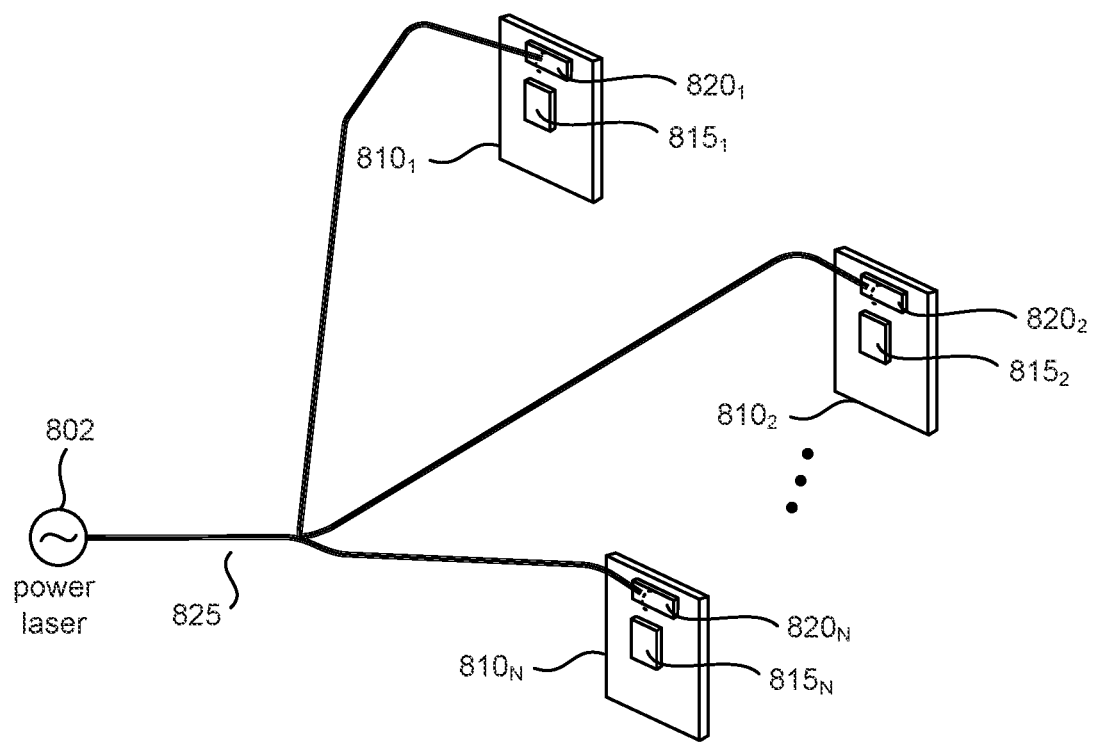
FIG. 10 shows a multitude of elements of a system adapted to be powered by an optical signal carried by an optical fiber, in accordance with one embodiment of the present disclosure.

FIG. 10 shows N elements $810_1, 810_2 \ldots 810_N$ of a system 800 that is adapted to receive power from an optical signal carried by optical fiber 825, in accordance with one embodiment of the present disclosure. Each element $810_i$ (where i is an index ranging from 1 to N) which may be a receive element of a phased array, is shown as including a receiver circuit $815_i$ and an optical power converter $820_i$.

Optical fiber 825 delivers the optical signal generated by optical power source 802—which may be a laser or a high efficiency light emitting diode—to optical power converters $820_1, 820_2 \ldots 820_N$, collectively and alternatively referred to herein as 820. Each optical power converter $820_i$ may be a photodiode operating as a photovoltaic converter that is adapted, in one embodiment, to convert the optical power to DC. In other embodiments, if the optical signal generated by power source 802 is modulated at a frequency of interest, each optical power converter $820_1$ may convert the received optical signal to an AC power. The power generated by each optical power converter $820_i$ is used to fully power the receiver circuit $815_i$ and any other electrical, optical, or opto-electronic devices disposed on its associated element $810_i$. Therefore, in accordance with embodiments of the present invention, all electrical, optical, or opto-electronic devices of system 800 are powered by the optical signal delivered by optical fiber 825.

Depending on the power levels, wavelengths, and distances between the power source 802 and the elements of system 800, any number of combinations of optical power sources, optical fibers, and/or photovoltaic converters may be used. In some embodiments, a relatively thicker core fiber with relatively higher power handling capability may be used. In other embodiments, a multi-mode fiber may be used to couple and deliver a broad range of modes more efficiently and in a cost-effective manner.

In some embodiments, the bandgap associated with the photovoltaic power converters are matched to the wavelength(s) of the optical power source to optimize the recovery efficiency.

Figure 11A:
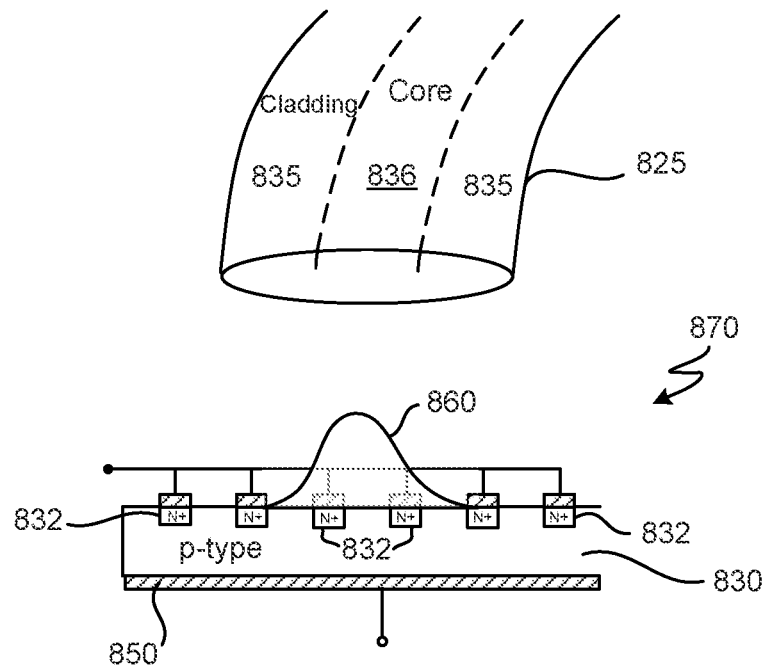
FIG. 11A is a cross-sectional view of a photovoltaic diode receiving optical signal from an optical fiber, in accordance with one embodiment of the present disclosure.
Figure 11B:
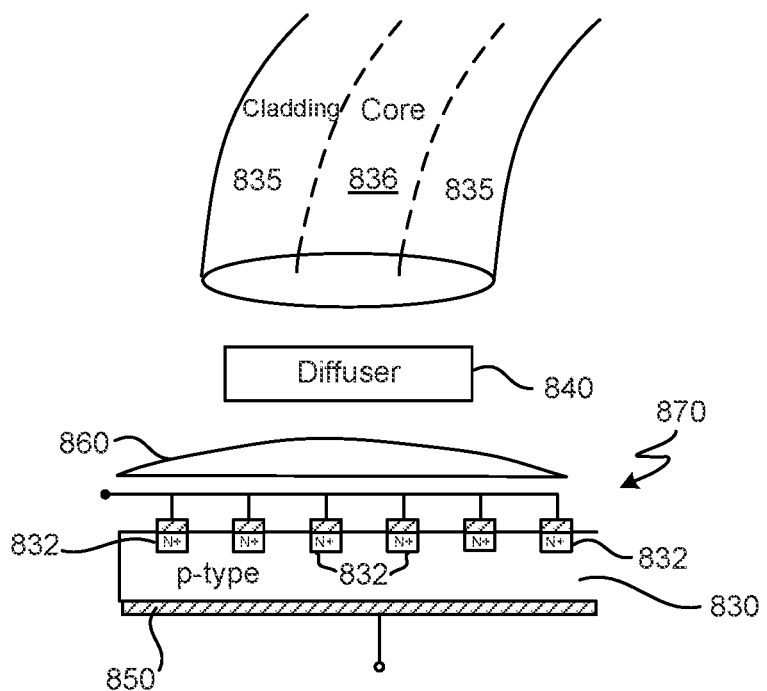
FIG. 11B is a cross-sectional view of a photovoltaic diode receiving optical signal from an optical fiber, in accordance with one embodiment of the present disclosure.

The photovoltaic power converters may be formed in a number of different way. FIG. 11A shows an exemplary photovoltaic power converter 870, in accordance with one embodiment of the present disclosure. Photovoltaic power converter diode 870 is shown as including a multitude of doped n+ regions 832 formed in a p-type semiconductor substrate 830. Metal layer 850 formed on the back side of substrate 830 forms one terminal of photovoltaic power converter diode 870. Doped n+ regions 832 form the second terminal of photovoltaic power converter diode 870. The optical signal impinging from optical fiber 825 on photovoltaic power converter diode 870 is shown as having an optical intensity distribution 860. Optical fiber 825 is shown as having a core 836 and cladding layer 835. To increase the uniformity of the intensity distribution 860 across the n+ regions 832 of the photovoltaic power converter diode 870, in some embodiments, diffuser 840 may be used at the end of the optical fiber, as shown in FIG. 11B. A number of other techniques may also be used to make intensity distribution 860 more uniform.

As described above, in some embodiments, each element $810_i$ shown in FIG. 10 is a receive element of a phased array. As the number of arrays in a phased array grows in size, the distribution of the high-speed data across the multiple elements causes a substantial overhead in complexity, cost, power consumptions, size, mass, and the like. To overcome these challenges, a phases array, in accordance with embodiments of the present invention, is entirely controlled, driven and powered via optical fibers. Accordingly, delivery of the control signals, data signals, reference clock signals and the power required to operate the phased array is achieved using only one or more optical fibers.

Figure 12:
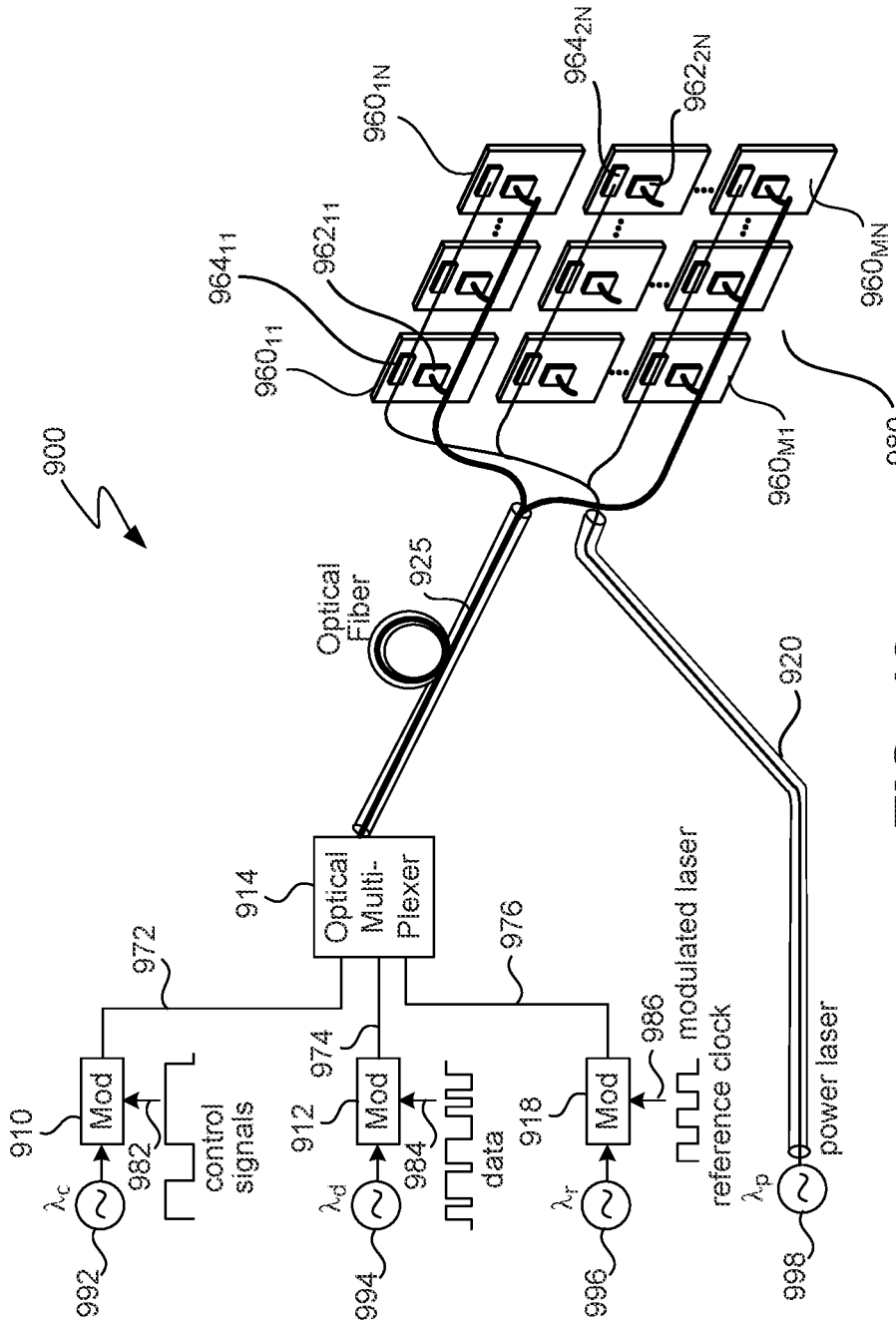
FIG. 12 is a simplified high-level schematic diagram of a phased array receiving power and modulated data, control and reference timing signals using optical fiber, in accordance with one embodiment of the present disclosure.

FIG. 12 is a simplified schematic diagram of a system 900, in accordance with one embodiment of the present disclosure. System 900 is shown as including, in part, a phased array transmitter/receiver 980, modulators 910, 912, 918 optical multiplexer 914, and optical fibers 920 and 925. Phased array 980 is shown as including M×N transmit/receive elements $960_{ij}$, where i is an index varying from 1 to M, and j is an index varying from 1 to N. Each transmit/receive elements $960_{ij}$ is shown as including an optical power converter $964_{ij}$ and a transmit/receive element $962_{ij}$.

The optical signal generated by optical source 992 and having a wavelength $\lambda_c$ is modulated with control signal 982 to generate control-modulated optical signal 972; the optical signal generated by optical source 994 and having a wavelength $\lambda_d$ is modulated with data signal 984 to generate data-modulated optical signal 974; and the optical signal generated by optical source 996 and having a wavelength is modulated with reference clock signal 986 to generate clock-modulated optical signal 976. Optical signals 972, 974, and 976 are multiplexed using optical multiplexer 914 and delivered to the transmit elements of the phased array via optical fiber 925 after being demultiplexed and processed, as described in U.S. application Ser. No. 17/476,375, filed Sep. 15, 2021, the content of which is incorporated herein by reference in its entirety.

Modulators 910, 912 and 918 may perform any one of a number of different modulation schemes, either known or developed in the future. Such modulation schemes include, for example, intensity modulation (IM), multi-level pulse amplitude modulation (PAM), phase modulation (PM), quadrature amplitude modulation (QAM), and the like.

The optical signals carried by optical fiber 925 may be demultiplexed in a variety of ways. In one exemplary embodiment, the optical signals with wavelengths $\lambda_c$, $\lambda_r$, and $\lambda_d$ impinge on a multitude of silicon-based photodetectors that are partitioned into multiple sections each adapted to have the highest level of sensitivity to a different one of the optical wavelength $\lambda_c$, $\lambda_r$, and $\lambda_d$. This can be achieved using a multitude of different techniques, such as by placing different color filters on the different sections of the photodiodes receiving different signals. The color filters may be formed using any one of the known techniques. For example, the color filters may be formed using pigment or die within a translucent matrix. In another embodiment, the color filters may include, for example, multi-layer wavelength-selective films, or any other wavelength-selective structure that may be deposited, attached, or placed on select sections of the photodiode, as known by those skilled in the art.

Optical signal source 998 is adapted to deliver optical signal to phased array 980 via optical fiber 920. The optical signal carried by optical fiber 920 is converted to DC power (or AC power as described above) by each optical power converter $964_{ij}$ to power the electrical and opto-electronic components disposed in its associated transmit/receive element $960_{ij}$. Phased array 980 is therefore flexible, mechanical reformable, and less costly to manufacture. Although in FIG. 12, the power and the modulated data, control and reference timing signals are shown as being delivered using two separate optical fibers 920 and 925, it is understood that in other embodiments, the optical power and the modulated data, control and reference timing signals may be carried and delivered to the phased array using the same optical fiber. In yet other other embodiments, the modulated data, control reference timing, and power signals may be carried and delivered to the phased array using different optical fibers each dedicated to carrying one of the data, control signal, reference timing signal, and/or the power signal. It is understood that any permutation of combined or separately driven fibers is within the scope of the embodiments of the present disclosure.

Figure 13:
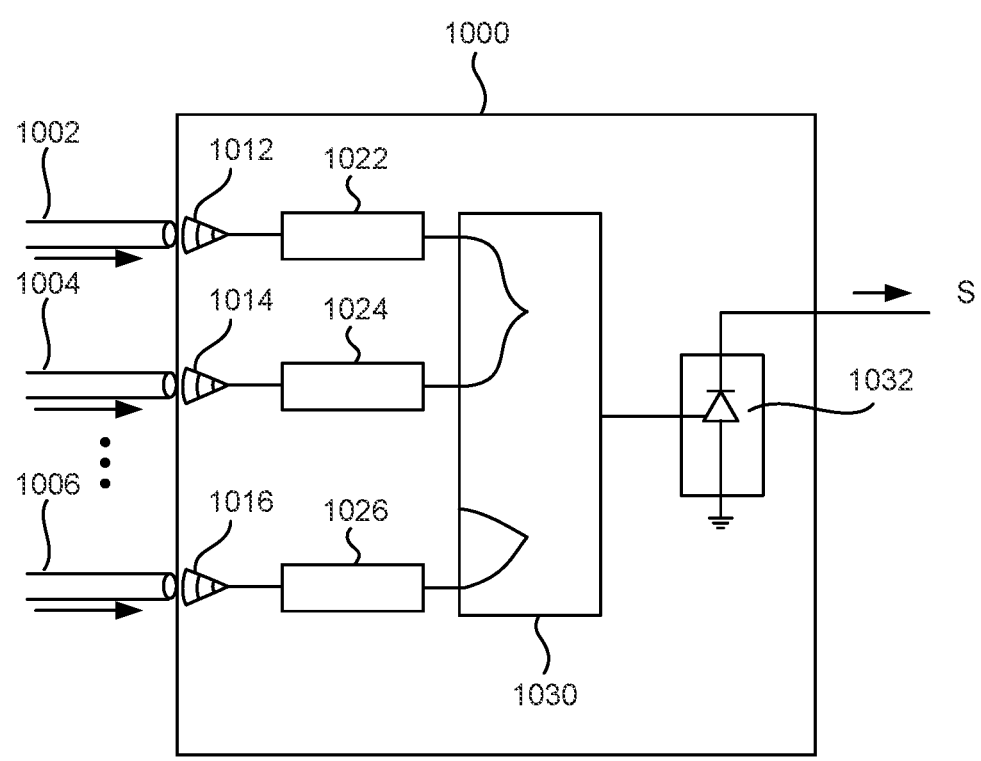
FIG. 13 is high-level schematic diagram of a photonics integrated circuit adapted to combine the modulated optical signals carried by optical fibers, in accordance with one exemplary embodiment of the present disclosure.

FIG. 13 is high-level schematic diagram of a photonics integrated circuit 1000 adapted to combine the modulated optical signals carried by the optical fibers, in accordance with one exemplary embodiment of the present disclosure. Photonics integrate circuit 1000 is shown as including, in part, a multitude of optical couplers 1012, 1014 . . . 1016, each associated with and adapted to receive a modulated optical signal delivered by a different one of the optical fibers, a multitude of electronically controlled adjustable delay lines, and an optical combiner 1032.

The modulated optical signal carried by optical fiber 1002 is shown as being delivered to electronically controlled adjustable delay line 1022 by optical coupler 1012; the modulated optical signal carried by optical fiber 1004 is shown as being delivered to electronically controlled adjustable delay line 1024 by optical coupler 1014; and the modulated optical signal carried by optical fiber 1006 is shown as being delivered to electronically controlled adjustable delay line 1026 by optical coupler 1016.

Each electronically controlled adjustable delay line is adapted to delay the signal it receives and deliver the delayed signal to combining network 1030. Combining network combines the received signals to generate a combined signal that is delivered to photodiode 1032. In response photodiode 1032 generates an electrical signal S. In other embodiments (not shown), the optical signal from each optical signal carrier is optically coupled to a different photodetector (e.g., a photodiode) disposed either on or off the photonic chip. The electrical signals generated by the photodetectors are then added.

The above embodiments of the present invention are illustrative and not limitative. The above embodiments of the present invention are not limited by the number of array elements, the type of modulators, and the like. The above embodiments of the present invention are not limited by the wavelength or frequency of the signal being received. Other modifications and variations will be apparent to those skilled in the art and are intended to fall within the scope of the appended claims.

What is claimed is:

1. A system comprising:
a first receiving element receiving an RF signal;
a second receiving element receiving the RF signal;
a first amplifier adapted to amplify the RF signal received by the first and second receiving elements;
a second amplifier adapted to amplify a signal representative of an output of the first amplifier; and
an optical modulator adapted to modulate a first optical signal in accordance with an output of the second amplifier to generate a modulated optical signal.

2. The system of claim 1 wherein said optical modulator is a photodiode.

3. The system of claim 1 further comprising: a mixer adapted to downconvert a frequency of the output of the first amplifier and deliver the frequency downconverted signal to the second amplifier.

4. The system of claim 1 wherein said first optical modulator is a Bragg reflector carrying the optical signal in one direction and the modulated optical signal in a second direction opposite the first direction.

5. The system of claim 1 further comprising: a first adjustable delay element adapted to delay an output of the first receiving element; and a second adjustable delay element adapted to delay an output of the second receiving element.

6. The system of claim 5 wherein each of said first and second adjustable delay elements comprises a plurality of switched capacitors.

7. The system of claim 5 wherein each of said first and second adjustable delay elements comprises a random-access memory.

8. The system of claim 1 further comprising:
an optical fiber adapted to deliver a second optical signal to the first and second receiving elements to provide power to the first and second receiving elements;
at least one photovoltaic power converter adapted to convert the second optical signal delivered via the optical fiber to an electrical signal; and
a diffuser disposed between the optical fiber and the photovoltaic power converter to increase a distribution of an intensity of the second optical signal delivered by the optical fiber to the photovoltaic power converter.

9. A method comprising:
receiving an RF signal via a first receiving element;
receiving the RF signal via a second receiving element;
amplifying the RF signal received by the first and second receiving elements to generate a first amplified signal;
amplifying a signal representative of the first amplified signal to generate a second amplified signal; and
modulating a first optical signal in accordance with the second amplified signal to generate a modulated optical signal.

10. The method of claim 9 further comprising:
modulating the first optical signal using a photodiode.

11. The method of claim 9 further comprising:
downconverting a frequency of the first amplified signal; and amplifying the frequency downconverted signal to generate the second amplified signal.

12. The method of claim 9 wherein said modulation is performed by a Bragg reflector carrying the optical signal in one direction and the modulated optical signal in a second direction opposite the first direction.

13. The method of claim 9 further comprising:
delaying the RF signal received by the first receiving element by a first adjustable delay value; and delaying the RF signal received by the second receiving element by a second adjustable delay value.

14. The method of claim 13 wherein said first adjustable delay value is generated by a plurality of switched capacitors.

15. The method of claim 13 wherein said first adjustable delay value is generated by a random-access memory.

16. The method of claim 9 further comprising:
delivering, by an optical fiber, a second optical signal to the first and second receiving elements to provide power to the first and second receiving elements;
converting, by at least one photovoltaic power converter, the second optical signal to an electrical signal; and
using a diffuser disposed between the optical fiber and the photovoltaic power converter to increase a distribution of an intensity of the second optical signal.

* * * * *